United States Patent [19]

Markel et al.

[11] 4,288,407
[45] Sep. 8, 1981

[54] METHOD AND APPARATUS FOR TREATING MATERIAL IN A FLUIDIZED BED

[76] Inventors: Richard F. Markel, Box 10327 Federal Station, Greenville, S.C. 29603; W. M. Goldberger, 415 S. Parkview, Columbus, Ohio 43209

[21] Appl. No.: 913,758

[22] Filed: Jun. 8, 1978

Related U.S. Application Data

[62] Division of Ser. No. 592,118, Jul. 1, 1975, abandoned.

[51] Int. Cl.³ ............................................. B01J 8/42
[52] U.S. Cl. ................................ 422/143; 422/145; 422/146; 422/199
[58] Field of Search .............. 422/139, 142, 143, 145, 422/146, 147, 199; 201/31, 36, 17, 19; 202/120, 121; 423/448, 460, 461; 48/65

[56] References Cited

U.S. PATENT DOCUMENTS

| | | | |
|---|---|---|---|
| 2,485,317 | 10/1949 | Roetheli | 422/142 X |
| 2,596,611 | 5/1952 | Weidman et al. | 422/142 X |
| 2,729,598 | 1/1956 | Garbo | 201/31 X |
| 2,733,137 | 1/1956 | Swaine et al. | 422/142 |
| 2,755,325 | 7/1956 | Brugger | 422/199 X |
| 2,789,085 | 4/1957 | Rollman | 201/17 X |
| 3,009,781 | 11/1961 | Johnson et al. | 201/19 X |
| 3,122,541 | 2/1964 | Schmitt et al. | 422/199 X |
| 3,314,767 | 4/1967 | Bernstein | 422/199 X |
| 3,369,871 | 2/1968 | Hardy et al. | 201/17 X |
| 3,370,938 | 2/1968 | Newman et al. | 422/142 X |
| 3,398,718 | 8/1968 | Pilloton | 422/146 X |
| 3,541,025 | 11/1970 | Oda et al. | 201/31 X |
| 3,684,446 | 8/1972 | Markel | 423/448 |
| 3,981,690 | 9/1976 | Chen et al. | 201/31 X |
| 3,993,450 | 11/1976 | Schora, Jr. et al. | 422/146 |
| 4,098,649 | 7/1978 | Redker | 201/2.5 |

FOREIGN PATENT DOCUMENTS 855247  11/1960  United Kingdom ............... 422/146

Primary Examiner—Arnold Turk
Attorney, Agent, or Firm—Cook, Wetzel & Egan, Ltd.

[57] ABSTRACT

A method and apparatus for the continuous high temperature treatment of sulfur-containing carbonaceous particles in an electrothermally heated fluidized bed is disclosed. In one aspect of the invention, a fluidizing stream is passed through carbonaceous particles introduced into a fluidizing zone at a velocity sufficient to fluidize said carbonaceous particles. The carbonaceous particles are heated in a fluidized state, and controllably fed into and discharged from the fluidizing zone at a rate sufficient to assure that the sulfur content of the particles are reduced below 0.5%. In another aspect of the invention, at least a portion of the carbonaceous material is transformed from a relatively amorphous molecular state, into a graphite crystalline state.

8 Claims, 3 Drawing Figures

METHOD AND APPARATUS FOR TREATING MATERIAL IN A FLUIDIZED BED

This is a division of application Ser. No. 592,118, filed July 1, 1975, now abandoned, which was the parent of continuation application Ser. No. 926,901, filed on July 21, 1978, and issued as U.S. Pat. No. 4,160,813 on July 10, 1979.

BACKGROUND OF THE INVENTION

This invention relates, in general, to a method and apparatus for treating material at relatively high temperatures, and in particular, to the high temperature treatment of sulfur-containing carbonaceous material. More particularly, one aspect of the invention relates to a method for continuously purifying and desulfurizing sulfur-containing carbonaceous material by maintaining the material in a fluidized bed and heating it to relatively high temperatures for a sufficient period of time to reduce the sulfur content of the material below about 0.5%. In another aspect of the invention, at least a portion of the material is transformed from a relatively amorphous molecular state to a more crystalline structure for the production of graphite.

It is well known in the art that carbonaceous material, such as calcined petroleum coke, can be almost completely desulfurized by subjecting it to relatively high temperatures, preferably in excess of 1700° C. The graphitization of such material is time-temperature dependent, and can generally be accomplished by heating the material to even higher temperatures, preferably in excess of 2200° C. Many existing systems, however, are incapable of achieving or maintaining the relatively high temperatures needed to advantageously and efficiently produce a high quality, uniformly purified product. Further, the desulfurization systems of the prior art have generally been incapable of economically reducing the sulfur content of the material below about 0.5%.

The prior art further shows numerous methods and apparatus attempting to uniformly heat various carbonaceous materials. Some of these methods and apparatus teach the use of a fluidizing stream to agitate the material during heating in a portion of a heating chamber known as a fluidizing zone. The combination of the fluidizing stream and the material agitated in the fluidizing zone is sometimes referred to herein as a fluidized bed. Heretofore it has been generally believed that treatment of material in a fluidized bed would be impractical or inefficient for particulate material of various sizes, particularly relatively large size particles, because of the difficulty of maintaining the large particles in a fluidized state even at high fluidizing gas flow rates.

Not only are some prior art material treatment systems limited by the desulfurization that can be achieved, or by the size of particulate material that can be economically fluidized, but they suffer from many other drawbacks and deficiencies as well. For example, many systems are incapable of treating material on a continuous basis, while others can produce commercial quantities of treated material only by utilizing a relatively large apparatus. Such apparatus, however, are generally too cumbersome or expensive to be practical.

It is thus a primary object of the invention to overcome these and other drawbacks in the prior art by providing an improved method and apparatus for treating sulfur-containing material such as particulate petroleum coke or other carbonaceous material.

It is another object of the invention to provide an improved material treatment system capable of achieving and maintaining the relatively high temperatures needed to advantageously and efficiently produce a high quality, uniformly desulfurized product having less than about 0.5% sulfur.

It is a further object of the invention to provide an improved material treatment system capable of agitating a variety of particle sizes, including relatively large sizes, in a fluidized bed with a minimal flow of fluidizing gas.

It is still another object of the invention to provide an improved material treatment system capable of continuously and economically producing commercial quantities of desulfurized material.

It is still another object of the invention to provide an improved material treatment system capable of economically transforming at least a portion of carbonaceous material from a relatively amorphous molecular state into a more crystalline graphitic structure.

Still another object of the invention is to provide an improved material treatment system capable of uniformly treating material of various sizes.

These and other objects of the invention are achieved by subjecting the sulfur-containing material of a fluidized bed to relatively high temperatures, generally not achieved in prior art systems. At these unusually high temperatures the fluidizing gas needed to maintain the material at a fluidized state is desirably, and unexpectedly, less than that which had been heretofore anticipated. Thus, where the prior art suggests that various size particles, particularly relatively large particles, could not be uniformly fluidized in a gas stream, this result can now be achieved. Moreover, through this technique, a sulfur-containing material can be continuously, economically, and uniformly treated so as to reduce the sulfur content below about 0.5%.

SUMMARY OF THE INVENTION

The foregoing objects of one aspect of the invention, along with numerous features and advantages thereof, are achieved by apparatus for continually introducing sulfur-containing carbonaceous material, a substantial portion having a particle diameter size of greater than about 0.008 inches, into a fluidizing zone independently of a fluidizing medium and continually discharging therefrom approximately equal amounts thereof; passing a fluidizing medium consisting essentially of an inert gas through the fluidizing zone at velocities sufficient to fluidize uniformly the sulfur-containing carbonaceous material, to remove sulfur-containing gas and to prevent reprecipitation of sulfur into the fluidizing zone; heating the material while in such uniformly fluidized state to a temperature in excess of about 1700° C.; and controlling the temperature of the sulfur-containing carbonaceous material in the fluidized zone to assure that the sulfur content thereof is reduced to below 0.5%.

BRIEF DESCRIPTION OF THE DRAWINGS

An exemplary embodiment of the method and apparatus summarized above is illustrated in the following drawings in which.

DETAILED DESCRIPTION OF AN EXEMPLARY EMBODIMENT

Before describing the method and apparatus of the invention in detail, a general explanation of the exemplary embodiment would be appropriate. In brief, sulfur-containing carbonaceous material such as petroleum coke is calcined by conventional means and adapted to be continuously fed into the heating chamber of an electrical resistance furnace. The coke may be fed directly from the calciner and/or passed through means for removing moisture and oxygen to prevent corrosion inside the furnace. The calcined coke particles can be of diverse sizes, covering a diameter range of 0.008 to 0.500 inches.

Upon entering the heating chamber, the calcined coke particles are agitated by an upwardly directed fluidizing gas stream. The particles are maintained in the heating chamber for a sufficient period of time to permit passage of a relatively large electric current through the carbonaceous material and the fluidizing gas stream. As a result, the calcined particles are heated to extremely high temperatures generally exceeding 1700° C., and preferably in excess of 2500° C. In one aspect of this embodiment, the combination of agitating the carbonaceous material by the fluidizing stream and heating the material to such relatively high temperatures results in the production of a high-quality, uniformly desulfurized product having a sulfur content less than about 0.5%. In another aspect of this embodiment, at least a portion of the carbonaceous material is transformed from a relatively amorphous molecular state into a more crystalline graphitic structure.

After heating, the treated carbonaceous material gravitates to the bottom of the heating chamber, passes through a manifold, and enters a cooling chamber. Inside the cooling chamber the temperature of the material is reduced by several thousand degrees. Conveying means, such as an auger, then cooperate with an outlet at the bottom of the cooling chamber to controllably remove the cooled desulfurized product from the furnace. At the same time, however, additional calcined material is fed into the apparatus where it is heated by direct electrical resistance as explained above. In this manner, the apparatus is adapted to continuously treat relatively large quantities of carbonaceous material in a relatively short period of time.

Figure 1:
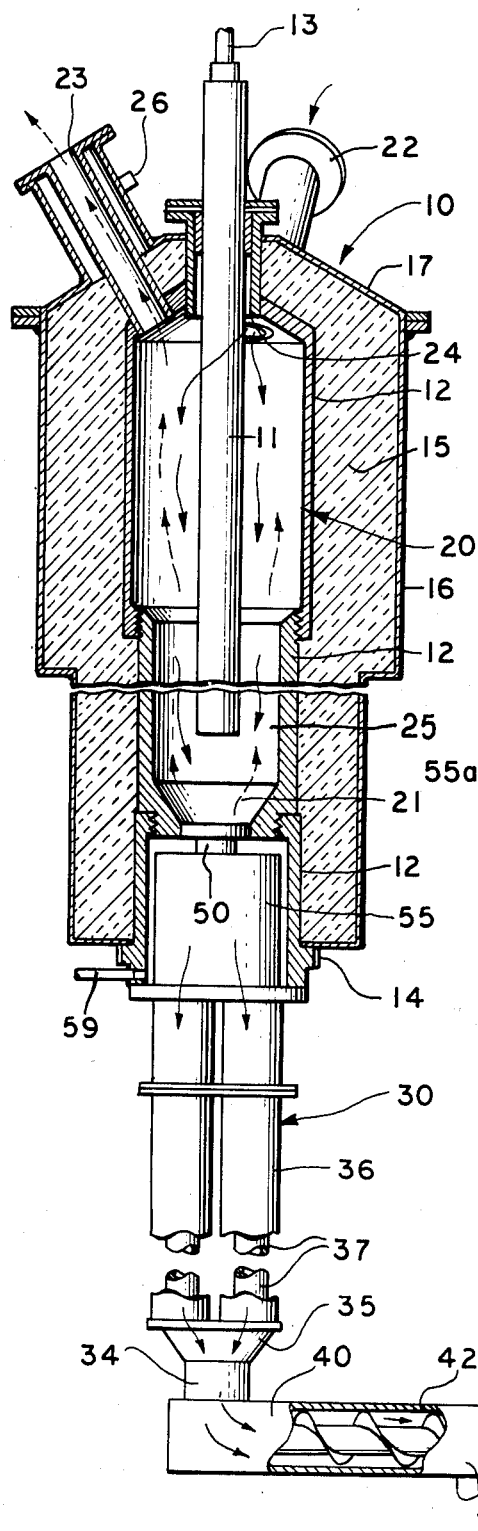
FIG. 1 is a fragmented sectional view of an apparatus illustrating the invention.

Referring now to the drawings, and in particular to FIG. 1, a furnace, constructed in accordance with the exemplary embodiment of the invention is generally indicated by reference numeral 10. The furnace 10 has a heating chamber 20 and a cooling chamber 30 disposed below heating chamber 20. The heating chamber 20 is substantially cylindrical in shape and terminates in a tapered bottom portion 21. Surrounding the heating chamber 20 is a heavy layer of thermal insulation 15 which is preferably encased by a metal enclosure 16. This insulation 15 serves to minimize heat loss from the heating chamber 20, thereby maximizing the efficiency of the furnace 10.

Extending through an opening 24 at the top of heating chamber 20, is a rod-type electrode 11, fabricated from electrically conductive heat-resistant material such as graphite. Electrode 11 terminates outside heating chamber 20 at an electrode terminal 13, adapted to receive a source of electrical power (not shown). The power source typically provides 20 to 200 volts between the heating chamber 20 and electrode terminal 13, though in this embodiment a voltage of 80 to 120 volts is preferably supplied.

Defining the bottom section of the substantially cylindrical wall of heating chamber 20 is a second sleeve-type electrode 12, disposed substantially coaxially relative to longitudinal electrode 11. Electrically coupled to electrode 12, but extending outside heating chamber 20, is a second electrode terminal 14 also connected to the power supply. This point may be grounded if desired. When sulfur-containing carbonaceous material, such as material which may contain as much as 3.5% sulfur, is introduced inside heating chamber 20, a conductive path is established between electrode 11 through a fluidized bed to electrode 12. The application of voltage between electrodes 11 and 12 causes the material to be radpidly heated by direct electrical resistance, thereby reducing the sulfur content of the material below about 0.5% and preferably below 0.02% in a manner explained in greater detail hereinafter.

Carbonaceous material to be desulfurized, such as petroleum coke, metallurgical coke, or coal char, or any other material to be treated, is introduced into heating chamber 20 by means of an inlet 22 located at the top of furnace 10. Inlet 22 is, of course, preferably adapted to receive a continuous supply of material from conventional calcining means (not shown). It should be observed that feeding the carbonaceous material in from the top of heating chamber 20 causes the material to be desirably preheated as it drops through the freeboard space above the fluidized bed. As mentioned hereinbefore, the sizes of carbonaceous material entering heating chamber 20 through inlet 22 may vary widely, the typical range of variance being from a minimum diameter of about 0.008 inches to a maximum diameter of about 0.500 inches. The carbonaceous material entering heating chamber 20 beings to gravitate downwardly toward bottom portion 21 as indicated by the solid arrows in FIG. 1. However, as explained in greater detail hereinafter, this downward movement of carbonaceous material is opposed by the upward force of a fluidizing stream emanating from annular distribution means 50 located at the lower extremity of heating chamber 20. The fluidizing stream thus serves to agitate and suspend the material inside heating chamber 20. The portion of heating chamber 20 in which the carbonaceous material is agitated and suspended by the fluidizing stream is commonly referred to as a fluidizing zone, which is identified herein by reference numeral 25. As explained hereinbefore, the combination of the material and the fluidizing stream in the fluidizing zone is known as a fluidized bed.

The fluidizing stream generally consist of an inert gas such as nitrogen, and moves upwardly in the direction indicated by the broken arrows in FIG. 1. In this exemplary embodiment, the superficial velocity of the fluidizing stream at the bottom of heating chamber 20 is about 1.5 feet per second, while the superficial velocity of the gas stream at the top of the fluidizing zone 25 is approximately 1.0 foot per second. The carbonaceous material is thus agitated and suspended inside heating chamber 20, and particularly within fluidizing zone 25, for a sufficient period of time to produce a uniformly treated product.

The difference in velocities of the fluidizing stream at the top and bottom of fluidizing zone 25 is due to the tapered configuration of bottom portion 21 and is partially offset by the evolution of gases such as sulfide gases from the incoming carbonaceous material. Due to this velocity gradient, the larger sized carbonaceous particles, which require higher velocities to fluidize, and which might otherwise tend to become more concentrated near the bottom of heating chamber 20, are dispersed throughout the bed.

The hot fluidizing gas which comprises the fluidizing stream emanating from distribution means 50, along with the volatiles and fine dust evolved from the carbonaceous material, escape through an exhaust port 23 disposed at the top of heating chamber 20. To prevent exhaust port 23 from clogging due to the solidification of condensible components such as metallic impurities sometimes associated with the carbonaceous material, port 23 is maintained at temperatures in excess of the condensation temperature of the impurities by thermal conduction from the furnace. Alternatively, heating means such as an electrical resistance heating element indicated by reference numeral 26, can be used. Heating element 26 maintains the metallic impurities in a vaporized state to facilitate their passage through exit port 23, and away from inlet 22, thereby preventing redeposition of the metallic impurities at the inside of the furnace. As another alternative, halogen-containing gas such as chlorine can be included in the fluidizing stream to react with metallic impurities and convert them to chlorides which are volatile and thus will not condense at exit port 23.

Figure 2:
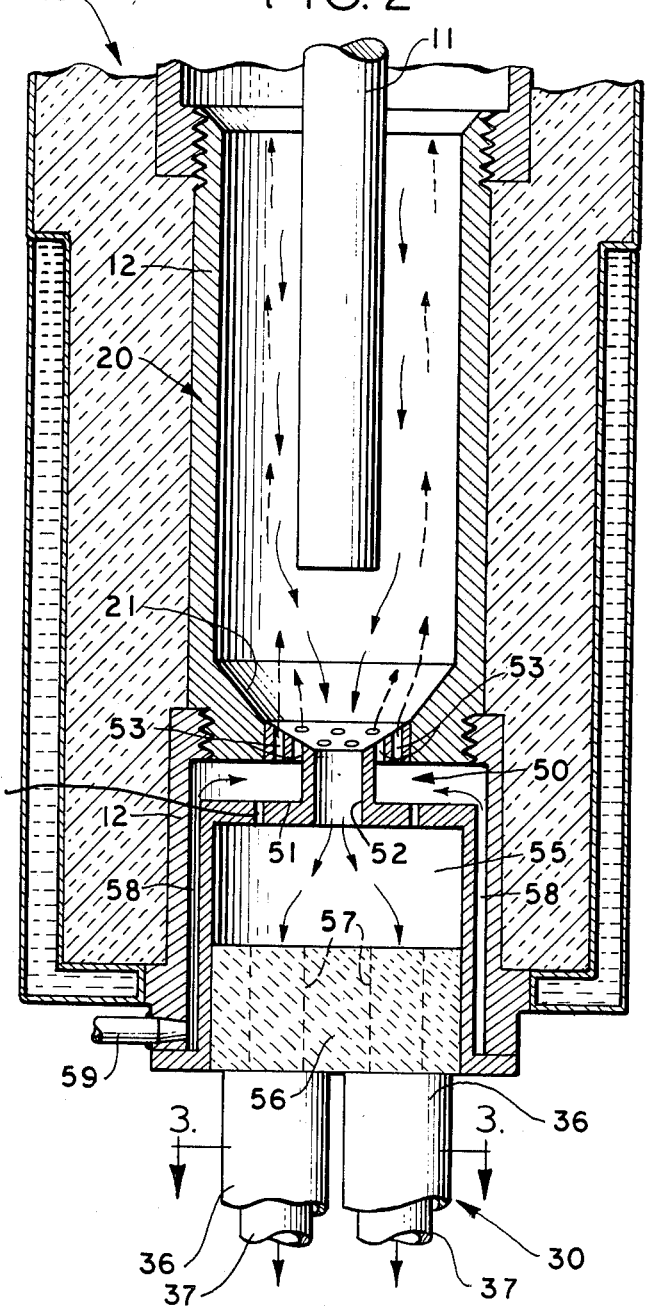
FIG. 2 is an enlarged view of a portion of the apparatus illustrated in FIG. 1.

The production of the fluidizing stream, emanating from annular distribution means 50, is best understood by referring to FIG. 2. In particular, distribution means 50 are shown to include an annular core 51 having a central opening 52. Associated with core 51 are a plurality of evenly spaced apertures 53. Apertures 53 communicate with a substantially annular passageway 58 surrounding a portion of furnace 10 between heating chamber 20 and cooling chamber 30.

At least one fluidizing gas inlet 59, disposed outside furnace 10, cooperates with annular passageway 58 for passing a fluidizing gas thereto. The fluidizing gas is typically an inert gas such as nitrogen. Some hydrogen may also be included in the fluidizing stream because it tends to promote desulfurization at lower temperatures. The fluidizing gas passes through passageway 58 and apertures 53, into heating chamber 20 and fluidizing zone 25. At fluidizing zone 25, the fluidizing gas mixes with and agitates the carbonaceous material, introduced through inlet 22. En route through passageway 58, the fluidizing gas is subjected to the relatively high temperatures from the upper section of the cooling chamber 55 and through opening 55a, and as a result, it is preheated prior to entering the fluidizing zone.

The preheating of the fluidizing gases desirably increases the viscosity thereof. This increase in viscosity enables the fluidizing gases to mix more readily with the carbonaceous material. As a result, the material, including the relatively larger particles, are more uniformly agitated and fluidized in fluidizing zone 25. Comparable fluidization of the relatively larger particles comprising the material could be theoretically accomplished heretofore only by greatly increasing the velocity of the fluidizing stream which increases gas usage and also increases the expenditure of energy.

As calcined coke, or other material is continuously introduced into heating chamber 20, the treated product is urged downwardly through central opening 52 of core 51. The material passes through opening 52 and into a manifold 55, under the force of gravity as a result of the removal of previously treated material from below. Disposed in manifold 55 is a plug of insulation 56 which provides substantial thermal isolation between heating chamber 20 and cooling chamber 30. Insulation 56 has a plurality of passages 57 for transferring graphitized material from manifold 55 to cooling chamber 30.

Figure 3:
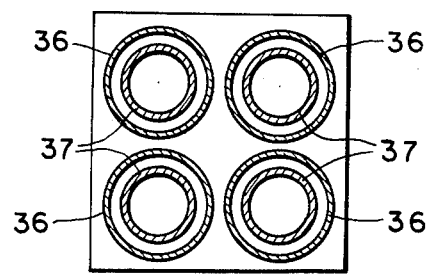
FIG. 3 is a sectional view of a portion of the apparatus taken along lines 3—3 of FIG. 2.

As shown best in FIG. 3, cooling chamber 30 has a corresponding plurality of vertical tubes 37, cooperating with vertical passages 57 to receive the treated material. Vertical tubes 37 are preferably fabricated from stainless steel, and may be lined with graphite and porous carbon. Surrounding tubes 37 are sleeve means 36 adapted to carry cooling water pumped from conventional means (not shown). The cooling water in sleeves 36 serves to reduce the average temperature of the material to about 1100° C. from the relatively high temperatures sometimes exceeding 2500° C. in heating chamber 20.

Referring again to FIG. 1, vertical tubes 37 of cooling chamber 30 are shown terminating in a funneling member 35. Funneling member 35, which is also water-jacketed, serves to pass the cooled material through an outlet port 34 to a horizontally disposed auger 40. In this exemplary embodiment, auger 40 is water cooled and is surrounded by a water jacket 42 to further cool the completed product to about 200° C. FIG. 1 further shows a gas inlet 49 secured to outlet port 34. Gas, such as nitrogen, typically passes through gas inlet 49 and passes upwardly into cooling chamber 30. Cooling chamber 30 is thus purged with a counter-current flow of gas from inlet 49 to prevent fluidizing gases from the fluidized bed from flowing into the cooling chamber.

Means such as a motor 41 are adapted to control the speed of auger 40, and hence the rate at which material can be removed from furnace 10. By controlling the speed of auger 40, and the rate of feed of incoming material, the level of the fluidized bed is maintained constant and the time in which carbonaceous material is maintained inside furnace 10 can be determined. As a result, the material is continuously introduced, treated, cooled and removed from furnace 10. When this occurs, the sulfur content of the material, upon removal from furnace 10, will generally be reduced below 0.5%, with the capability of reduction below 0.02%. Reducing the quantity of sulfur to such minute percentages has been heretofore unachievable in such an economical, continuous system of the type described.

From the foregoing, the method for treating carbonaceous material inside furnace 10 should be clear. First, the material is introduced into fluidizing zone 25 of heating chamber 20. A fluidizing gas stream is then passed through the material in the fluidizing zone at a velocity sufficient to fluidize the material, which is then heated in a fluidized state within the fluidizing zone. The rate of flow of the carbonaceous material through the fluidizing zone is controlled to assure that the sulfur content of the material is reduced below about 0.5%, and preferably below 0.02%.

More particularly, sulfur-containing carbonaceous material, which is generally in a relatively amorphous molecular state, is passed through inlet 22 and into heating chamber 20. The material is typically calcined and de-moisturized prior to passage through inlet 22 as explained hereinbefore. Upon entering heating chamber 20, the material gravitates downwardly until subjected to the upward forces of the fluidizing stream emanating from gas inlet 59, and passing into heating chamber 20 via passageway 58 and apertures 53 of manifold 50. The fluidizing stream uniformly interacts with material at fluidizing zone 25 to form the fluidized bed described above. The material from inlet 22 is thus maintained in a fluidized state in fluidizing zone 25 of heating chamber 20.

While the material is in this fluidized state, an electric current is passed between electrodes 11 and 12, through the fluidized bed. Accordingly, the material in fluidizing zone 25 is uniformly heated to relatively high temperatures. For example, in one aspect of this embodiment, the material is heated to temperatures exceeding about 1700° C. to assure that the sulfur content of the material is reduced below about 0.5% and preferably below 0.02%. In another aspect of this embodiment, the material is heated above about 2500° C. for a sufficient period of time to transform the molecularly amorphous material to a more crystalline graphite state.

After treatment, the material passes downwardly through central opening 52 of manifold 50, and into cooling chamber 30 where it is cooled to temperatures of about 1100° C. The material is removed from cooling chamber 30 via the water-jacketed auger 40, which further cools the material to temperatures of approximately 200° C. The rate of removal of the material is controlled by the speed of auger 40, and the rate at which additional material to be treated is fed into heating chamber 20 through inlet 22.

As the treated material is moved downwardly out of heating chamber 20, the fluidizing gas stream moves upwardly and exits via port 23. Metallic impurities, along with volatiles and fine particles, are also passed out of heating chamber 20 through port 23. To insure that these impurities and wastes will not clog port 23, however, they are maintained in a vaporized state by the application of heat from heating element 26.

In practicing this method, an exemplary set of approximate parameters has been determined as follows:

| | |
|---|---|
| rate at which material is heated | 80° C./second |
| average retention time in the fluidized bed | 25 minutes |
| temperature of the fluidized bed | 2300° C. |
| energy input | 0.96 kwh/lb. |
| sulfur content of original material | 1.49% |
| sulfur content of treated material | 0.045% |
| maximum particle size | 0.265 inches |

These parameters contrast significantly with certain prior art systems capable of heating material at about 0.3° C./second or less with energy inputs of 2.0 kwh/lb. Other systems are incapable of reducing sulfur content much below 1.0%. Still others are not able to accommodate particle sizes above eight mesh or widely varying material size distributions. In view of the foregoing, it should also be apparent that the energy input per pound of product treated is significantly lower in the present system than those systems of the prior art.

Though the exemplary embodiment herein disclosed is preferred, it will be apparent to those skilled in the art that numerous modifications, refinements and improvements which do not part from the scope of the invention can be devised. The appended claims are intended to cover all such modifications, refinements and improvements.

We claim:

1. An apparatus for treating carbonaceous particulate material comprising:
   a heating chamber including receiving means for continuously receiving a quantity of fluidizable, carbonaceous particles from an upper portion thereof and particle discharge means disposed at a lower portion of said heating chamber for continuously discharging said carbonaceous particles, said heating chamber having interior wall surfaces which are formed of a carbonaceous material to serve as a first electrode;
   a second electrode of elongate shape disposed within said heating chamber along a substantial length of the longitudinal axis of said interior wall surfaces comprising said first electrode and in contact with said received carbonaceous particles;
   means for supplying electrical current to said electrodes; and
   means for fluidizing said carbonaceous particles within said heating chamber to form a fluidized zone within said chamber, said fluidized zone coincidental with an electrothermal zone formed by the flow of electrical current between said interior wall surfaces comprising said first electrode and said second electrode by means of and through said carbonaceous particles.

2. The apparatus defined in claim 1 further including means defining a cooling chamber disposed below said heating chamber adapted to cool the material continuously passed from said bottom portion of said heating chamber.

3. The apparatus defined in claim 2 further including means, cooperating with said cooling chamber, for transporting said material therefrom.

4. The apparatus defined in claim 1 wherein said means for fluidizing said carbonaceous particles includes means for dispensing a fluidizing gas, and annular distribution means, disposed in said bottom portion of said heating chamber, having a plurality of vertically disposed apertures adapted to pass said fluidizing gas from said dispensing means into said heating chamber.

5. The apparatus defined in claim 4 wherein said heating chamber has an upper portion including heated outlet means for permitting a portion of said fluidizing gas and impurities associated with said material to escape from said heating chamber.

6. The apparatus defined in claim 4 wherein said means for dispensing a fluidizing gas further communicates with said particle discharge means.

7. The apparatus defined in claim 4 further including means defining a cooling chamber disposed below said heating chamber adapted to cool the material controllably passed from said bottom portion of said heating chamber, and wherein said annular distribution means communicates directly with said cooling chamber.

8. The apparatus defined in claim 7 wherein said annular distribution means is disposed between said cooling chamber and said heating chamber and communicates with both.

* * * * *